United States Patent [19]

Deka

[11] Patent Number: 5,785,772
[45] Date of Patent: Jul. 28, 1998

[54] METHOD AND APPARATUS FOR CONTROLLING GALVANNEAL INDUCTION FURNACE OPERATION

[75] Inventor: Mitrajyoti Deka, Coopersburg, Pa.

[73] Assignee: Bethlehem Steel Corporation

[21] Appl. No.: 863,475

[22] Filed: May 27, 1997

Related U.S. Application Data

[63] Continuation of Ser. No. 568,339, Dec. 6, 1995, abandoned.

[51] Int. Cl.[6] .................................................. C21D 1/54
[52] U.S. Cl. ........................... 148/508; 266/78; 266/90; 266/103
[58] Field of Search .............................. 148/508, 509; 266/78, 90, 96, 91, 103, 114; 118/620, 63; 427/209

[56] References Cited

U.S. PATENT DOCUMENTS

| | | | |
|---|---|---|---|
| 2,773,161 | 12/1956 | Baker | 219/10.77 |
| 2,813,186 | 11/1957 | Bock | 219/10.61 |
| 2,876,335 | 3/1959 | Rendel | 219/155 |
| 3,058,840 | 10/1962 | Kerr et al. | 117/93 |
| 3,307,968 | 3/1967 | Schnedler | 117/114 |
| 3,385,946 | 5/1968 | Hatchard | 219/10.47 |
| 3,398,252 | 8/1968 | Bock et al. | 219/10.61 |
| 3,496,033 | 2/1970 | Gilbreath, Jr. et al. | 148/13 |
| 3,548,171 | 12/1970 | Kodz | 235/151.1 |
| 3,662,140 | 5/1972 | Schwestka et al. | 266/3 R |
| 3,868,094 | 2/1975 | Hovis | 266/5 T |
| 4,004,138 | 1/1977 | Morooka et al. | 235/151.1 |
| 4,243,441 | 1/1981 | Wilson | 148/128 |
| 4,307,276 | 12/1981 | Kurata et al. | 219/10.41 |
| 4,359,210 | 11/1982 | Peterson | 266/87 |
| 4,373,364 | 2/1983 | Tanimoto et al. | 72/8 |
| 4,595,427 | 6/1986 | Drew et al. | 148/129 |
| 4,606,529 | 8/1986 | Tooch | 266/80 |
| 4,761,530 | 8/1988 | Scherer et al. | 219/10.71 |
| 4,845,332 | 7/1989 | Jancosek et al. | 219/10.77 |
| 4,895,736 | 1/1990 | Sommer et al. | 427/45.1 |
| 5,094,702 | 3/1992 | Kothmann et al. | 148/128 |
| 5,156,683 | 10/1992 | Ross | 118/620 |
| 5,214,258 | 5/1993 | Akers | 219/10.77 |
| 5,399,376 | 3/1995 | Flinchum et al. | 427/209 |
| 5,423,926 | 6/1995 | Sashihara et al. | 148/508 |
| 5,453,127 | 9/1995 | Flinchum et al. | 118/63 |

OTHER PUBLICATIONS

Galvatech '95 Conf. Proceedings; "Mechanisms of the Galvanizing Reaction . . . ", by Guttmann et al.; pp. 295–307 Dec. 1995.

Galvatech '95 Conf. Proceedings; "Determination of the Active Al and Fe Contents . . . " by Biele; pp. 769–775 Dec. 1995.

"Alloying Behavior of Galvannealéd Steel Sheet" by Tokunaga et al.; Tetsu–to–Hagne v. 70 (Dec. 1984) n.14, pp. 1727–1733.

Galvatech '95 Conf. Proceedings; "A New Galvannealling Process Controller" by Stadbawer et al.; pp. 81–85 Dec. 1995.

Galvatech '95 Conf. Proceedings; "Design of Square Temperature–Time Cycle for Optimal Galvannealed Sheet" by Hardy et al.; pp. 193–198 Dec. 1995.

Galvatech '95 Conf. Proceedings; "Revamping of Segal's Galvannealling Section by High Frequency (HF) Induction and Misting Jets" by Beguin et al.; pp. 199–203.

*Primary Examiner*—Scott Kastler

[57] ABSTRACT

A method for controlling operation of a galvanneal induction furnace includes the steps of providing a steel strip having a molten zinc coating applied thereto and transporting the strip to an induction furnace in which the strip and coating are to be alloyed. The temperature which the strip is estimated to attain just prior to entering the furnace is then calculated. A temperature which the strip should achieve during the alloying reaction is then selected. The power which must be applied to the furnace to elevate the strip temperature from the estimated temperature to the alloying temperature is then calculated. Power is then supplied to the furnace.

19 Claims, 2 Drawing Sheets

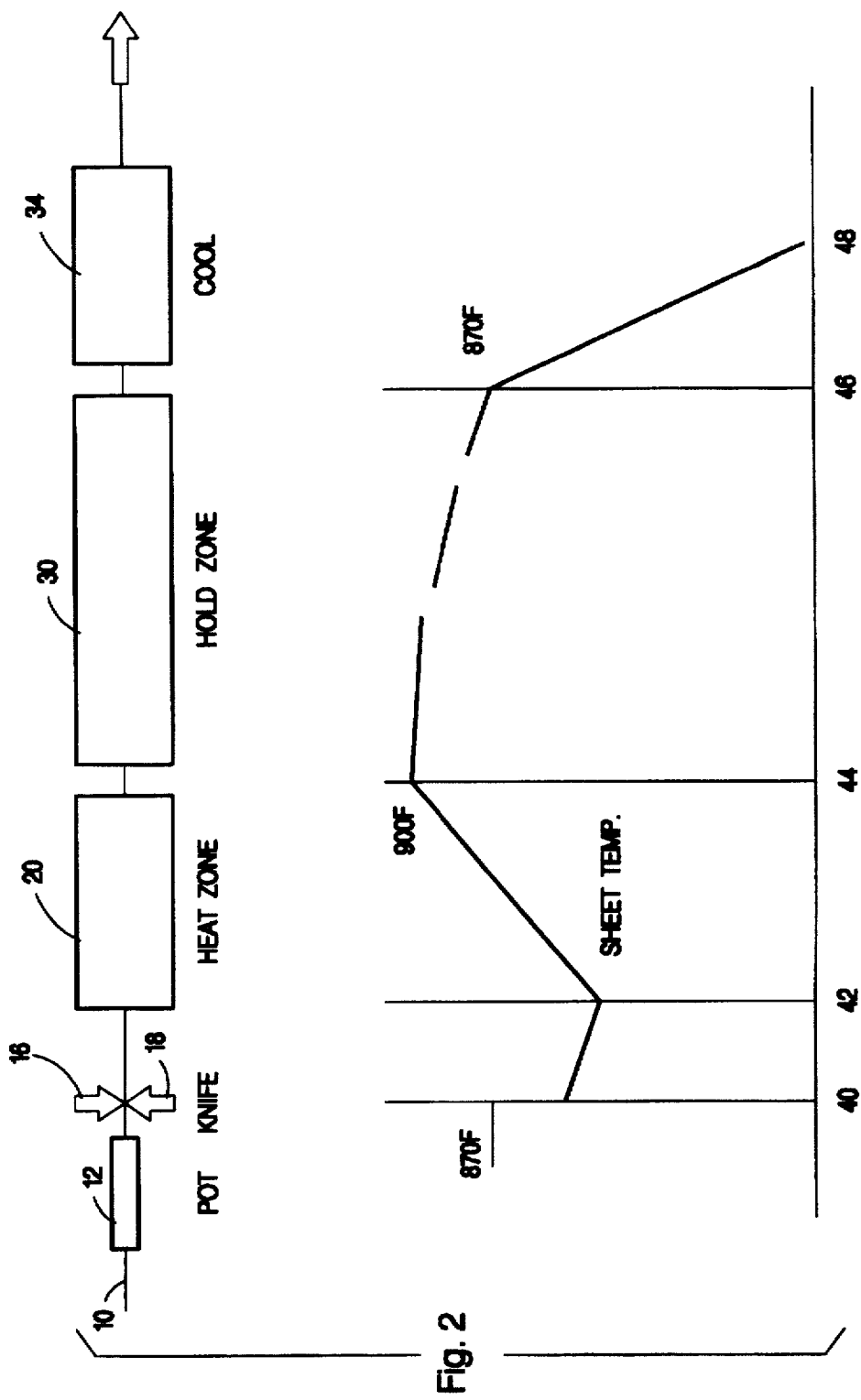

METHOD AND APPARATUS FOR CONTROLLING GALVANNEAL INDUCTION FURNACE OPERATION

This is a continuation of application Ser. No. 08/568,339, filed on Dec. 6, 1995, now abandoned.

FIELD OF THE INVENTION

The invention is to a method and apparatus for controlling operation of a galvanneal induction furnace to optimize galvanneal production. More particularly, the invention is directed to a method and apparatus in which the temperature of the strip prior to entering the furnace is estimated so that furnace operating parameters may be set with a feed forward control to achieve a desired temperature, with the strip exit temperature thereafter being measured to permit the furnace power to be adjusted with a feedback control.

BACKGROUND OF THE INVENTION

Galvanneal steel sheet is produced in a continuous galvanizing line by heating (annealing) a zinc coated sheet in a furnace. The zinc coating is converted during the annealing process into a zinc-alloy coating known as galvanneal. The use of galvanneal strip in the automotive industry is increasing rapidly. Steel manufacturers world-wide have made significant investments in galvanneal production facilities, and the market for the resulting product is quite competitive.

All of the manufacturers attempt to maintain product quality through control over various process parameters. Strip temperature control has the most significant impact on galvanneal quality. The quality of the galvanneal coating is defined primarily by how well the coating adheres to the substrate during forming, with the temperature at which the zinc-coated product is annealed being the most significant parameter on the adhesion characteristic. Paintability and weldability, two other desirable characteristics of galvanneal, are also influenced by the degree of alloying and can be controlled by adjusting the strip temperature during annealing.

The three primary steps in the galvanneal process are (1) coating, (2) heating, and (3) cooling. A typical galvanneal line has a pot in which a bath of molten zinc is contained and through which the steel sheet proceeds in order to therein be coated. Following the pot is a furnace, which may be an electrically operated induction furnace or a conventional gas-fired furnace. Following the furnace is a hold zone, in which the sheet is held to retain its temperature or to be permitted to relatively slowly cool. The alloying reaction typically continues outside the furnace in the hold zone.

As the surface of the coating is transformed from zinc to galvanneal, then the emissivity is dramatically changed within a rather short time. Emissivity is the ability of a surface to emit radiant energy compared to that of a black body at the same temperature and with the same area. Because emissivity changes as alloying proceeds, then temperature measurements based upon emissivity have been unreliable, and not suitable for adequately controlling operation of an annealing furnace.

The thickness of the zinc coating typically is controlled by removing excess molten zinc with air knives. These air knives blow a relatively high pressure wiping gas, such as air, nitrogen, or steam, at the coating to remove the excess zinc, with the result that the coating typically is 5-12 micrometers thick. The air knives normally will lower the temperature of the coating and the sheet, with additional heat being lost as the strip proceeds from the pot to the furnace. Once in the furnace, however, then the sheet is heated to a desired temperature, with the desired temperature dependent upon various factors, such as steel grade, bath aluminum content, aim degree of alloying, etc.

The sheet temperature changes during each step of the galvanneal process. The sheet loses considerable amount of heat when it passes through the air knives, and additional heat is lost during the traverse from the knives to the furnace. It is difficult to predict the heat required in the furnace to raise the sheet temperature to a desired value, because the temperature at which the sheet enters the furnace is not known. It is also difficult to measure the strip temperature accurately at the exit of the furnace, because the product emissivity changes significantly during the alloying process. Therefore, the temperature to which a sheet actually is heated is not accurately known. Attempts have been made to use simple radiation thermometers to measure strip temperature after the alloying process has been completed and to use multi-wavelength pyrometers to measure strip temperature in the hold zone. None of these prior attempts can accurately determine the sheet temperature at the exit of the furnace, however.

In addition to losing heat during the air knife process and the traverse from the pot to the furnace, the strip also loses heat in the furnace due to radiation and convection. Heat input in the furnace to raise the temperature of the strip to the desired temperature should therefore take into account the furnace losses. A typical gas-fired furnace does not instantaneously adjust the heat applied to the strip, nor can the heat application to the strip in a gas-fired furnace be accurately predicted, due to effects ranging from strip surface quality, heat lost to the stack, combustion temperature, and the like. In an induction furnace, on the other hand, such effects are minimal, so that adjustment of the power to the furnace causes an almost instantaneous change in the heat being applied to the strip.

Those skilled in the art recognize that regulation of the temperature to which the strip is heated is an important parameter in assuring adhesion of the galvanneal coating to the steel strip. The disclosed invention meets that need by estimating the temperature of the strip prior to entering the furnace so that appropriate adjustment of the power applied to an induction furnace may be made through a feed forward control, with the strip exit temperature then being used as a feedback control for fine tuning the furnace power.

OBJECTS AND SUMMARY OF THE INVENTION

A primary object of the disclosed invention is a method and apparatus for controlling operation of a galvanneal induction furnace through a feed forward estimate of the strip input temperature used as the primary basis for setting the furnace power, with a feedback control based upon strip exit temperature being used to fine tune furnace power.

The disclosed invention consists of three primary steps used for regulating the power applied to a galvanneal induction furnace for heating a strip to a desired temperature for achieving satisfactory adhesion of the galvanneal coating to the sheet. In the first step, the temperature of the sheet just prior to entering the annealing furnace is estimated by taking into account heat losses experienced by the sheet during its traverse to the furnace from the coating bath and through the air knives and the atmosphere. In the second step, the heat required in the furnace to raise the sheet to a desired temperature is calculated, and the appropriate power applied to the furnace. In the third step, the strip temperature is measured using a radiation thermometer at the exit of the furnace, with the heat supplied to the furnace being adjusted based upon the measured temperature to control the sheet exit temperature within +/−5° F. of the desired temperature. Temperature measurement at the exit of the furnace may be implemented through a radiation thermometer. The emissivity of the coating is essentially constant, because the alloying reaction is then in the early stages and is occurring adjacent the strip and remote from the surface of the coating used for determining the temperature.

These and other features and advantages of the invention will be readily apparent in view of the following description and drawings of the above-description invention.

BRIEF DESCRIPTION OF THE DRAWINGS

The above and other objects and advantages and novel features of the present invention will become apparent from the following detailed description of the preferred embodiment of the invention illustrated in the accompanying drawings wherein:

FIG. 2 is a graph illustrating sheet temperature at various locations along the annealing line.

DETAILED DESCRIPTION OF THE INVENTION

Figure 1:
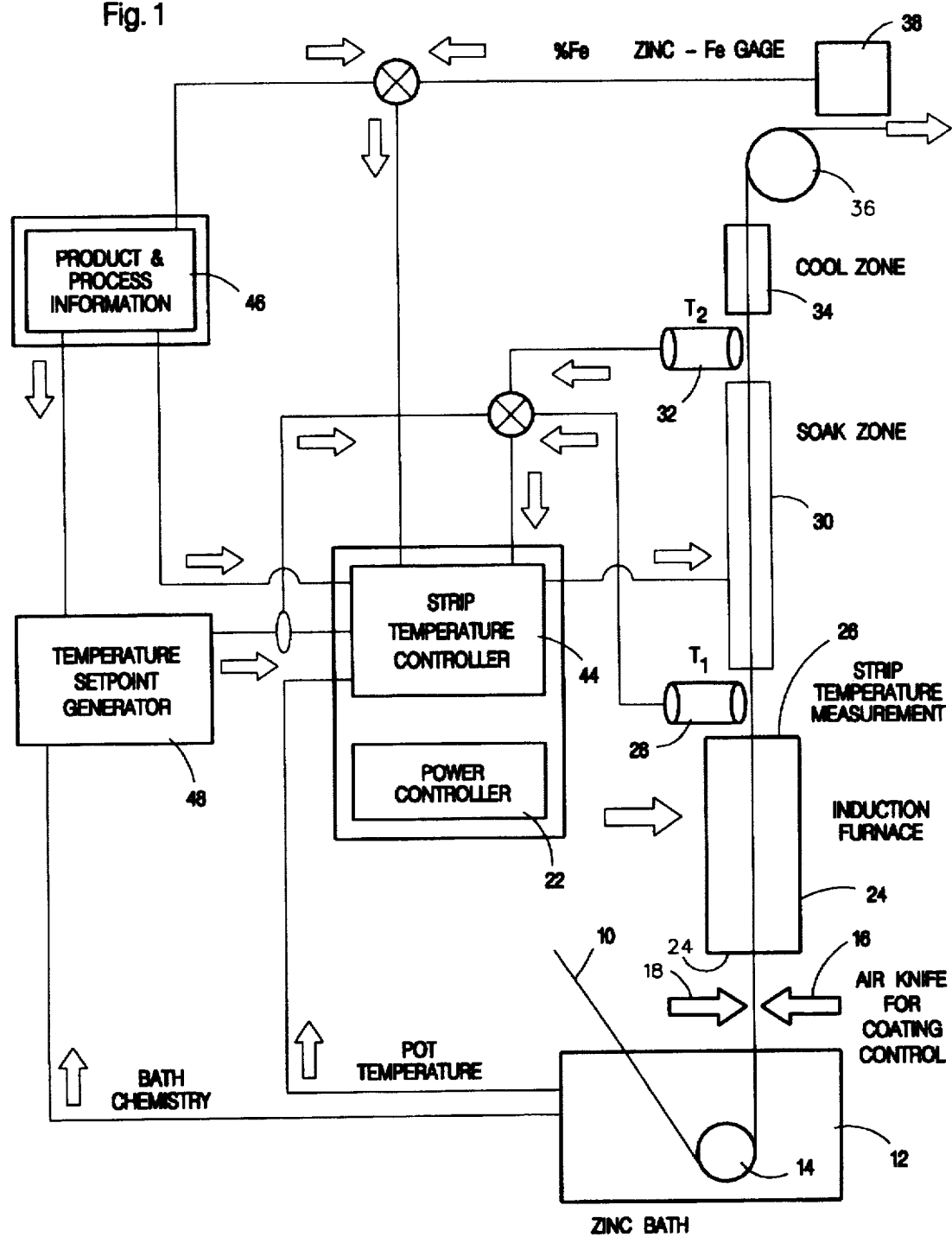
FIG. 1 is a schematic view illustrating a galvannealing line according to the invention.

Steel strip 10, as best shown in FIG. 1, has a zinc coating applied thereto at zinc bath 12. Typically a roller 14 will guide the strip 10 through the bath 12 to orient the strip vertically upon exit from bath 12. Air knives 16 and 18 are disposed on opposite sides of the strip 10 downstream of bath 12. Air knives 16 and 18 direct high pressure jets of wiping gas, such as air, nitrogen or steam, at the adjacent surfaces of the strip 10, to remove excess molten zinc from the strip 10 so that the coating thereon has a desired thickness. Typically the coating is on the order of 5–12 micrometers, so that the coating weight ranges from 35 to 90 grams per square meter. Preferably the strip gauge is from 0.024 to about 0.072 inches thickness. The strip proceeds along the galvanneal line at a speed of approximately 120 to about 380 feet per minute.

Electrically operated induction furnace 20 is downstream of bath 12 and air knives 16 and 18, and typically is vertically oriented. I prefer that the furnace be an electrically operated induction furnace, because response to changes in power supplied by controller 22 are almost instantaneous. Thus more precise control over the heat applied to the strip is available than could be achieved with a gas-fired furnace. Induction furnace 20 has an entry end 24 and an exit end 26. It can be noted in FIG. 1 that the strip 10 is a continuous strip, so that a continuous length of steel sheet is processed by the galvanneal line.

Temperature sensor 28 is immediately downstream from exit end 26 of furnace 20. I prefer that the temperature sensor be a radiation thermometer, such as available from Ircon. The thermometer 28 should be closely adjacent exit end 26 of furnace 20. The surface of the galvanized coating is at that point principally molten zinc, because the galvanneal reaction is occurring mainly at the strip/coating interface and not at the surface. Thus, the emissivity of the coating surface is essentially constant, with the result that an accurate temperature measurement may thereby be made using a radiation thermometer. Moreover, because the furnace is an induction furnace which radiates little or no external heat, then the temperature measured by the thermometer 28 will not be impacted by furnace-generated heat as could occur with a gas-fired furnace.

Downstream from thermometer 28 is soak zone 30 within which the strip 10 and its now annealing coating pass while retaining heat. Radiation thermometer 32 is downstream of soak zone 30 and measures the strip temperature during late stages of the alloying process. Cool zone 34 is downstream of thermometer 32, and the strip exits cool zone 34 at substantially ambient temperature. Preferably a roller 36 or the like is adjacent the exit of cool zone 34 for redirecting the strip horizontally for further processing, coiling, or the like.

In addition to the thermometer 28, a zinc-iron gauge 38 may be disposed downstream of cool zone 34 to measure the weight percent of iron in the coating. The zinc-iron gauge 38 is used as an indicator when the strip temperature is not adequate to maintain product quality, such as may occur when the provided coil parameters do not correspond with the parameters of the provided coil. In that event, the estimated input temperature to the furnace 20 may be incorrect, and thereby result in other than desired annealing quality. The zinc-iron gauge 38 therefore permits incorrect coil parameters to be accounted for, as will be further explained.

I have developed a thermal model which is used to determine the temperature drop of the strip as a result of operation of air knives 16 and 18, and to predict the temperature of the strip just prior to entering entry end 24 of induction furnace 20. This thermal model may be used to predict strip temperature at essentially any location in the galvannealing line. It permits the power requirement of the furnace 20 to be accurately estimated, and for most products these estimates are within ±5% of the power actually used in the furnace 20. A feed forward control system based on this thermal model alone may be used, although I prefer that a feedback loop from the thermometer 28 be utilized to fine tune power application to the furnace 20.

Alternatively, the feedback loop alone may be used for furnace control, and in that event may be utilized with a gas-fired furnace. The temperature monitoring instrument, when used with a gas-fired furnace, must be isolated from the furnace to avoid inaccurate temperature measurements but must be close enough to measure the temperature prior to the surface of the coating having been alloyed.

FIG. 2 illustrates the temperature of the strip 10 as it proceeds through the galvanneal line of FIG. 1. The strip temperature at the exit of the pot 12 is assumed to be the same as the pot temperature. Considering that both molten zinc and steel have relatively high thermal conductivity, that a typical strip has a thickness of less than 0.125 inches, and that the transit time through the zinc bath is approximately three seconds, then it can be safely assumed that the strip 10 attains the bath temperature during the coating process. A strip typically requires less than one second to achieve thermal equilibrium, even should it enter the molten zinc bath with a temperature difference therewith exceeding 100° F. Thus the strip exits the pot 12 at a temperature of approximately 870° F.

Upon exiting the pot 12, the strip 10 is covered with a very thick layer of molten zinc. The air knives are relatively close to the pot, so that the zinc coating will still be in molten form when the knives are operated. Typically the transit time to the air knives from the pot is about 0.25 seconds, and heat losses by the strip 10 during this transit are minimal and may be disregarded. Thus, the strip temperature is approximately the same as that of the bath when the air knives 16 and 18 are reached.

The air knives apply a high pressure jet of relatively cool wiping gas, such as air, nitrogen or steam, to the opposed surfaces of the strip 10. Because the temperature of the wiping gas used in the air knives is substantial less than the temperature of the strip, then heat will be lost by the strip on that account. The thermal model which I have developed takes into account the heat lost by the strip during the air wipe process, and the heat lost by the strip as it is transported between the air knives and the entry end 24 of the furnace 20. Equation 1 is an empirical relation which has been developed to determine the temperature drop of the strip when exposed to the high pressure air knife for weight control.

Equation 1

$$T_{Drop}=a/(\text{Strip Thickness}^{1.073}\times\text{Line Speed}^{0.5501}\times\text{Coating Weight}^{0.5971})$$

In equation 1, the constant "a" equals 564.677 for an air knife system using cooled nitrogen. Strip thickness is expressed in inches, line speed expressed in feet per minute, and coating weight in grams per square meter. This equation is consistent with the physical process in the sense that for a thinner coating, the strip is wiped harder with higher gas pressure. Thus, temperature drop in that case is higher. An increase in line speed also requires higher gas pressure. Heat loss is almost independent of strip thickness, however. Temperature drop is inversely proportional to strip thickness. The computation of Equation 1 is based upon heat transfer per unit area at the center of the strip, and does not take into account edge affects.

FIG. 2 illustrates at point 40 the temperature drop which occurs to the strip 10 as a result of operation of the air knives 16 and 18. No particular temperature is noted on FIG. 2, because the temperature is a function of the noted parameters. The temperature after the furnace 20 typically will be about 900° F. as at 44. After the hold zone, the temperature will be about 870° F. as at 46, and slightly higher than ambient at 48 after the cool zone.

The strip 10 also loses heat as the strip proceeds from the air knives 16 and 18 to furnace 20. The heat losses during this traverse are principally due to radiation and convection. The energy loss rate due to radiation, in joules per unit area is set forth in Equation 2.

Equation 2

$$\Delta Q_r = \epsilon\sigma(T^4\text{strip} - T^4\text{Ambient})$$

In Equation 2, epsilon and sigma are emissivity and Stefan Boltzman constant, respectively. The temperature of the strip is expressed in Kelvin, as is the ambient temperature.

The energy loss rate due to convection, in joules per unit area is given in Equation 3.

Equation 3

$$\Delta Q_c = 0.424\times 10^{-4}(T_{strip}-T_{Ambient})^{1.25}\times 4.186$$

In Equation 3, strip and ambient temperature are, as with Equation 2, expressed in Kelvin.

The rate at which the temperature drops during the transit between the air knives and the furnace 20 is expressed in Equation 4.

Equation 4

$$\Delta T(°F.)=15.070\times(\Delta Q_R+\Delta Q_c)/(5.249\times\text{Strip Thickness})$$

Because the surface of the strip 10 remains shiny upon exiting the furnace 20 due to the molten zinc on its surface, then the emissivity may be considered to be approximately 0.12. The ambient temperature is about 200° F. Considering that the strip temperature is approximately 820° F. after the air knives 16 and 18, then the rate at which heat is lost is not significantly affected by uncertainty in the ambient air temperature. If needed, a linear equation may be used to compute the total heat loss in this area. For a strip having a thickness of 0.036 inches, the temperature loss in this section is approximately 6° F. The temperature drop for the entire product mix is estimated to be between 6° and 10° F. Thus, the strip temperature at the point 42 in FIG. 2 just before entry into the furnace 20 is on the order of 815° F.

During the transit of the strip through the furnace 20, there is a heat gain due to the power applied to the furnace 20 by the power controller 22, as well as a simultaneous heat loss due to radiation and convection. The heat gain per unit mass, in kilojoule, may be computed pursuant to Equation 5.

Equation 5

$$\Delta Q=\text{Power Applied}\times\text{Efficiency for the product/Mass Flow Rate}$$

In Equation 5, power is expressed in kilowatts; efficiency is supplied by the furnace manufacturer; and mass flow rate is computed by multiplying strip gauge, strip width, line speed, and density.

The temperature gain in degrees Fahrenheit due to the applied power is set forth pursuant to Equation 6.

Equation 6

$$\Delta T=(\text{Power}\times\text{Eff.}\times 104.625)/(\text{Strip Width}\times\text{Line Speed}\times\text{Thickness})$$

In Equation 6, power is expressed in kilowatts, whereas width, speed, and thickness are in the same units as in Equation 1. "Eff." is furnace efficiency, typically supplied by the manufacturer.

The rate of heat loss in the furnace may be computed in a manner similar to that used for the segment between the air knives and the furnace. The ambient temperature is not significantly different from that in the prior section, due to circulation of cold water through the induction coils and air draft. The heat loss rate for different strip temperatures within the typical range for galvanneal does not change significantly. A simplified linear estimate may be used for these purposes.

The power required in the furnace to raise the strip 10 to a desired temperature—that is, the temperature set for a specific product—is computed pursuant to Equation 7. The selected temperature is based upon coil parameters, and is historically based.

Equation 7

$$\text{Power Req. (kW) (FF)}=\{T_{Set\ Point}-(T_{Pot}-T_{Drop\ at\ Knife}-T_{Loss\ in\ Air}-T_{Loss\ in\ Furnace})\}\times(\text{Width}\times\text{Line Speed}\times\text{Thickness})/(\text{Prod-Furn. Eff.}\times 104.625)$$

In Equation 7, temperature is expressed in degrees Fahrenheit, power in kilowatts, width in inches, line speed in feet per minute, and thickness in inches. Prod-Furn. Eff. is a parameter supplied by the furnace manufacturer. FF indicates that this as a feed forward parameter.

The strip temperature controller 44 of FIG. 1 computes the power required by furnace 20 to raise the strip 10 to the predetermined temperature to Equations 1-7. This power requirement is computed at least when each new order is processed. Thus, product and process information are received from source 46, and the temperature set point generator at 48 likewise provides information to controller 44. The temperature set point generator 48 receives information from the product and process information system 46 and also information about the bath chemistry of the pot 12. The temperature of the pot, preferably determined by a thermocouple, is directly input to the controller 44.

The strip temperature controller 44 provides a feed forward signal used by the power controller 22 to provide sufficient power to furnace 20 for heating the strip 10 to a predetermined temperature consistent with the product being processed and its satisfactory galvannealing. The strip temperature controller 44 also provides a feedback signal from the thermometer 28 which is used to adjust the power of the furnace 20 in response to the actually measured exit temperature of strip 10. The strip temperature at the exit of the furnace 10 is measured using a relatively simple radiation thermometer. Should the measured temperature differ significantly (outside the acceptable deviation) from the desired set point, then the power requirement is adjusted. The required adjustment is computed pursuant to Equation 8.

Equation 8

$$\text{Power Req. (kW) (FB)} = \{T_{Set\ Point} - T_{Measured} - T_{Bias}\} \times (\text{Width} \times \text{Line Speed} \times \text{Thickness})/(\text{Eff.} \times 104.625)$$

The eff. parameter is supplied by the manufacturer. "FB" indicates that this is a feedback parameter.

The temperature measurement in this section of the process may raise significant questions related to variability of surface emissivity due to the progress of the alloying, and the true value of the emissivity. Surface emissivity changes as alloying progresses. In the early stages of the alloying process, however, the reaction is confined principally to the steel/zinc interface and progresses therefrom toward the surface. As long as the alloying process does not affect the surface, then the surface is composed of molten zinc and the emissivity is the same for all product. Even if the strip temperature is well above the typical temperature used in the process, the emissivity is the same.

An error in the assumed emissivity of the product introduces error in the temperature measured using a radiation thermometer. A 10% error in emissivity introduces about a 2 ½% error in the measured temperature, i.e. about 20°-° F. in the temperature range of interest for galvanneal. Although this error is significant, such an error influences principally the bias and not the relative measurements used in this application. This bias may be adjusted based on process experience. A temperature bias term has been included in the computation to compensate for errors related to calibration of the pyrometer and uncertainty in the assumed emissivity. As long as the emissivity is substantially constant, then the system performs satisfactorily.

In addition, should the strip exit the furnace with alloying reaction taking place at the surface for any reason, i.e., at an alloying stage later than that described in the preferred mode, the emissivity will be much higher than that of molten zinc. Consequently, the strip temperature measured by the radiation thermometer will be significantly higher than the true temperature of the strip. This deviation in the measured temperature will cause the strip temperature controller 44 to react and reduce power to the furnace through the power controller 22, until the measured strip temperature is within the acceptable deviation. The system is thus capable of restoring the operating condition so that the strip exits the furnace with molten zinc on the surface, i.e., to the preferred mode of operation.

When the temperature set point originally determined at 46 for the product is not adequate to maintain the quality of the galvanneal coating on the product, due either to over or under alloying, then the percent iron content in the coating as determined by a zinc-iron gauge 38, such as may be purchased from a Data Measurement Corporation, may be used to adjust the temperature set point for the product. Preferably the iron content is from about 8% to about 11% by weight. The strip temperature controller 44 will use this adjusted temperature set point as the target value. Such a situation may arise when information needed for set point computation either is inaccurate or unavailable.

While this invention has been described as having a preferred design, it is understood that the invention is capable of further modifications, uses, and/or adaptations which follow in general the principle of the invention and includes such departures from the present disclosure as come within known or customary practice in the art to which the invention pertains and that may be applied to the central features hereinbefore set forth and fall within the scope of the limits of the appended claims.

What I claim is:

1. A method of controlling operation of a galvanneal induction furnace, the method comprising the steps of:
   a) providing a steel strip;
   b) transporting the steel strip through a zinc bath in order to apply a zinc coating to the steel strip;
   c) transporting the steel strip with the zinc coating to a galvanneal induction furnace in which the steel strip and zinc coating are to be alloyed;
   d) estimating by calculation as a friction of a thickness of the strip, a speed at which the strip is being transported, and a weight of the coating, a first temperature which the steel strip will attain after exiting the zinc bath, but before entering the induction furnace;
   e) selecting a second temperature that the steel strip shall attain in the induction furnace during an alloying reaction between the steel strip and the zinc coating;
   f) using the first estimated temperature to determine a power to be applied to the induction furnace for elevating a temperature of the steel strip to the second temperature;
   g) supplying the determined power to the induction furnace; and
   h) alloying the steel strip and zinc coating in the induction furnace at the second temperature.

2. A system for controlling the amount power applied to a galvanneal induction furnace, the system comprising:
   a) a galvanneal induction furnace;
   b) a zinc bath;
   c) means for transporting a steel strip through said zinc bath in order to apply zinc coating to said steel strip;
   d) means for transporting said steel strip, after it exits said zinc bath, to said galvanneal induction furnace so that said steel strip and zinc coating may be alloyed therein;

e) means for estimating by calculation as a function of a thickness of said strip, a speed at which said strip is being transported, and a weight of said coating, a first temperature which said steel strip will attain after said steel strip exists said zinc bath, but before said strip enters said induction furnace;

f) means for determining a second temperature that said zinc coated steel strip shall attain in said induction furnace;

g) means for using said estimated first temperature to determine a power level to be applied to said induction furnace for elevating said steel strip to said second temperature;

h) means for supplying said induction furnace with said determined power level; and i) means for alloying said steel strip and said zinc coating in said induction furnace at said second temperature.

3. A method of controlling operation of a galvanneal induction furnace, the method comprising the steps of:

a) providing a steel strip;

b) transporting the steel strip through a zinc bath in order to apply a zinc coating to the steel strip;

c) transporting the steel strip with the zinc coating to a galvanneal induction furnace in which the steel strip and zinc coating are to be alloyed;

d) selecting a first temperature by calculation as a function of a thickness of the strip, a speed at which the strip is being transported, and a weight of the coating, the steel strip should achieve during the alloying reaction between the steel strip and the zinc coating;

e) measuring a second temperature of a surface of the zinc coating while the surface is unalloyed;

f) using the second measured temperature to determine a power level to be applied to the induction furnace for correcting a temperature of the steel strip to the first selected temperature;

g) supplying the determined power level to the induction furnace; and h) alloying the steel strip and zinc coating in the induction furnace at the first selected temperature.

4. The method of claim 1, further including the steps of:

a) adjusting the thickness of the coating by passing the strip beneath an air wipe; and b) utilizing heat lost by the strip due to operation of the air wipe in determining the first estimated temperature.

5. The method of claim 1, including the steps of:

a) determining the heat lost by the strip on account of radiation and convection during transport to the furnace; and b) utilizing the determined heat lost due to radiation and convection when estimating the first estimated temperature.

6. The method of claim 5, further including the step of a) determining a temperature change of the strip by utilizing the determined heat lost due to radiation and convection.

7. The method of claim 1, further including the step of:

a) determining the power to be applied to the furnace by utilizing the determined heat lost by the strip in the furnace due to radiation and convection.

8. The method of claim 7, further including the step of:

a) utilizing the power to be applied, furnace efficiency, width of the strip, speed at which the strip moves through the furnace, and thickness of the strip in determining the second temperature.

9. The method of claim 1, further including the steps of:

a) measuring the temperature of the strip upon exiting the furnace;

b) determining whether the measured temperature equals the selected second temperature; and c) adjusting the power applied to the furnace utilizing a determination of a difference between the measured temperature and the selected second temperature.

10. The method of claim 9, including the step of:

a) adjusting the power in order to maintain the measured temperature within precision of the temperature measuring device.

11. The method of claim 9, including the step of:

a) measuring the temperature with a radiation thermometer.

12. The method of claim 11, including the step of:

a) measuring the temperature while the surface of the coating is unalloyed.

13. The method of claim 11, including the step of:

a) measuring the temperature while the emissivity of the surface of the coating is constant.

14. The method of claim 9, including the step of:

a) monitoring the coating with a zinc-iron gauge; and b) adjusting the power applied to the furnace in response to the zinc-iron gauge when the quality of the coating deviates by more than an acceptable amount.

15. The method of claim 14, including the step of:

a) utilizing the zinc-iron gauge to adjust furnace power when the iron content of the coating is other than from about 8% by weight to about 11% by weight.

16. The system of claim 2, further comprising:

a) a radiation thermometer downstream of the furnace and operable with the strip for measuring the temperature of the strip upon exit of the furnace and for communicating the measured temperature to the temperature controller.

17. The system of claim 16, further comprising:

a) a zinc-iron gauge downstream of said thermometer for monitoring the quality of the galvanneal coating and for communicating the monitored quality to the temperature controller.

18. The method of claim 3, including the step of:

a) measuring the temperature with a radiation thermometer.

19. The method of claim 18, including the step of:

a) providing a furnace selected from the group consisting of gas-fired and induction furnaces.

* * * * *